(12) United States Patent
Vitebsky

(10) Patent No.: US 11,696,144 B2
(45) Date of Patent: Jul. 4, 2023

(54) PRIMARY SIGNAL DETECTION VIA DISTRIBUTED MACHINE LEARNING COORDINATED ACROSS MULTIPLE USER EQUIPMENT DEVICES

(71) Applicant: CACI, Inc.—Federal, Arlington, VA (US)

(72) Inventor: Stanley Vitebsky, Millburn, NJ (US)

(73) Assignee: CACI, Inc.—Federal, Reston, VA (US)

( * ) Notice: Subject to any disclaimer, the term of this patent is extended or adjusted under 35 U.S.C. 154(b) by 0 days.

(21) Appl. No.: 17/173,384

(22) Filed: Feb. 11, 2021

(65) Prior Publication Data

US 2021/0274351 A1    Sep. 2, 2021

Related U.S. Application Data

(60) Provisional application No. 62/982,396, filed on Feb. 27, 2020.

(51) Int. Cl.
| | |
|---|---|
| *H04W 16/14* | (2009.01) |
| *H04W 4/38* | (2018.01) |
| *G06N 20/00* | (2019.01) |
| *H04W 4/80* | (2018.01) |
| *H04W 84/04* | (2009.01) |
| *H04W 88/06* | (2009.01) |

(52) U.S. Cl.
CPC ............ *H04W 16/14* (2013.01); *G06N 20/00* (2019.01); *H04W 4/38* (2018.02); *H04W 4/80* (2018.02); *H04W 84/042* (2013.01); *H04W 88/06* (2013.01)

(58) Field of Classification Search
CPC .................. H04W 72/082; H04W 28/0236
See application file for complete search history.

(56) References Cited

U.S. PATENT DOCUMENTS

| | | | | |
|---|---|---|---|---|
| 2014/0053261 | A1* | 2/2014 | Gupta | G06F 11/3013 717/171 |
| 2015/0242760 | A1* | 8/2015 | Miao | H04L 67/42 706/12 |
| 2016/0063393 | A1* | 3/2016 | Ramage | H04L 67/42 706/12 |
| 2017/0279828 | A1* | 9/2017 | Savalle | H04L 41/142 |
| 2018/0322389 | A1* | 11/2018 | O'Shea | G06N 3/08 |
| 2018/0375720 | A1* | 12/2018 | Yang | H04L 29/08 |
| 2019/0303752 | A1* | 10/2019 | Mercier | H04B 17/345 |
| 2019/0325350 | A1* | 10/2019 | Desai | G06N 20/00 |

(Continued)

*Primary Examiner* — Wen W Huang

(74) *Attorney, Agent, or Firm* — BakerHostetler; Tayan B. Patel

(57) ABSTRACT

Methods and systems for primary signal detection via distributed machine learning coordinated across multiple user equipment devices are disclosed. In an example method, In an example method, a first user equipment (UE) device, located in a predefined area, is caused to determine a first machine learning model configured to detect an anomaly in an RF environment associated with the area. The controller receives the first machine learning model from the first UE device. The controller sends the first machine learning model to a second UE device located in the area. The controller receives anomaly data indicative of an anomaly detected by the second UE device via the first machine learning model. The controller may optionally determine that a primary signal is present in an RF environment associated with the area based on the anomaly data.

20 Claims, 10 Drawing Sheets

(56) References Cited

U.S. PATENT DOCUMENTS

| | | | | |
|---|---|---|---|---|
| 2020/0219015 A1* | 7/2020 | Lee | ......................... | H04L 67/34 |
| 2020/0344314 A1* | 10/2020 | Mellqvist | ............ | H04L 67/2804 |
| 2021/0051678 A1* | 2/2021 | Suzaki | ................... | G06N 20/00 |
| 2021/0287080 A1* | 9/2021 | Moloney | .............. | G06N 3/0454 |
| 2021/0345132 A1* | 11/2021 | Jagannath | ............ | H04W 24/02 |

* cited by examiner

PRIMARY SIGNAL DETECTION VIA DISTRIBUTED MACHINE LEARNING COORDINATED ACROSS MULTIPLE USER EQUIPMENT DEVICES

CROSS-REFERENCE TO RELATED APPLICATION

This application claims priority to U.S. Provisional Application No. 62/982,396, filed Feb. 27, 2020, entitled "Systems and Methods of Radar Detection Using Distributed Machine Learning on User Equipment," which is incorporated by reference herein in its entirety.

FIELD

This application generally relates to primary signal detection and more particularly to primary signal detection using distributed machine learning.

BACKGROUND

In various contexts, a secondary signal operator may be permitted to operate in a geographical area and within a particular radio frequency band, but must yield to a primary signal in the area if present. Such a concern may arise, for example, within the context of dynamic spectrum sharing between primary signals (e.g., a radar signal) and the secondary signals used by cellular networks, such as 5G/NR or 4G/LTE. In this example, a radar ground station may operate within a frequency band only intermittently, with the frequency band being otherwise open to use by cellular network operators in the interim. However, should the radar ground station begin to send and receive radar signals (i.e., primary signals) in the frequency band, the cellular network operators must cease radio activity in the frequency band until the radar signals are no longer present in the area. Thus, to comply with this arrangement, it is important that the cellular network operators are, in fact, able to detect the presence of the radar signals or other primary signals.

While specialized standalone sensors may be potentially used to detect primary signals, this solution has proven impractical. For example, the number of such sensors and their coverage of the geographical area are limited by cost, regulations, policies, operational requirements, or other constraints.

Thus, what is desired in the art is a technique and architecture for primary signal detection using distributed machine learning.

SUMMARY

The foregoing needs are met, to a great extent, by the disclosed systems, methods, and techniques for primary signal detection using distributed machine learning.

One aspect of the patent application is directed to synchronizing distributed machine learning models used by user equipment devices for anomaly detection. In an example method, a first user equipment (UE) device, located in a predefined area, is caused to determine a first machine learning model configured to detect an anomaly in an RF environment associated with the predefined area. The method further includes receiving, by a controller, the first machine learning model from the first UE device. The method further includes sending, by the controller, the first machine learning model to a second UE device located in the predefined area. The method further includes receiving, by the controller and from the second UE device, anomaly data indicative of an anomaly detected by the second UE device via the first machine learning model. The controller may optionally determine that a primary signal is present in an RF environment associated with the predefined area based on the anomaly data from the second UE device (and/or based on anomaly data determined via the machine learning model from other UE devices in the predefined area).

In another example method, a first user equipment (UE) device, located in a predefined area, determines a first machine learning model configured to detect an anomaly in an RF environment associated with the predefined area. The method further includes receiving, by the first UE device, a second machine learning model determined by a second UE device located in the predefined area. The second machine learning model is also configured to detect an anomaly in an RF environment associated with the predefined area. The second machine learning model may have been determined by a second UE device located in the predefined area, for example. The method further includes determining, by the first UE device, anomaly data indicative of an anomaly detected by the first UE device via the second machine learning model. The method further includes sending, by the first UE device, the anomaly data to a controller configured to determine that a primary signal is present in an RF environment based on anomaly data sent from one or more UE devices.

In another example method, a first user equipment (UE) device, located in a predefined area, is caused to determine a first machine learning model configured to detect an anomaly in an RF environment associated with the predefined area. The method further includes receiving, by a controller and from the first UE device, one or more machine learning parameters of the first machine learning model. The method further includes sending, by the controller, the one or more machine learning parameters of the first machine learning model to a second UE device located in the predefined area. The method further includes receiving, by the controller and from the second UE device, anomaly data indicative of an anomaly detected by the second UE device via a second machine learning model. The second machine learning model is configured, at least in part, with the one or more machine learning parameters of the first machine learning model.

There has thus been outlined, rather broadly, certain embodiments of the application in order that the detailed description thereof herein may be better understood, and in order that the present contribution to the art may be better appreciated. There are, of course, additional embodiments of the application that will be described below and which will form the subject matter of the claims appended hereto.

BRIEF DESCRIPTION OF THE DRAWINGS

To facilitate a fuller understanding of the application, reference is made to the accompanying drawings, in which like elements are referenced with like numerals. These drawings should not be construed to limit the application and are intended only for illustrative purposes.

DETAILED DESCRIPTION

Figure 1:
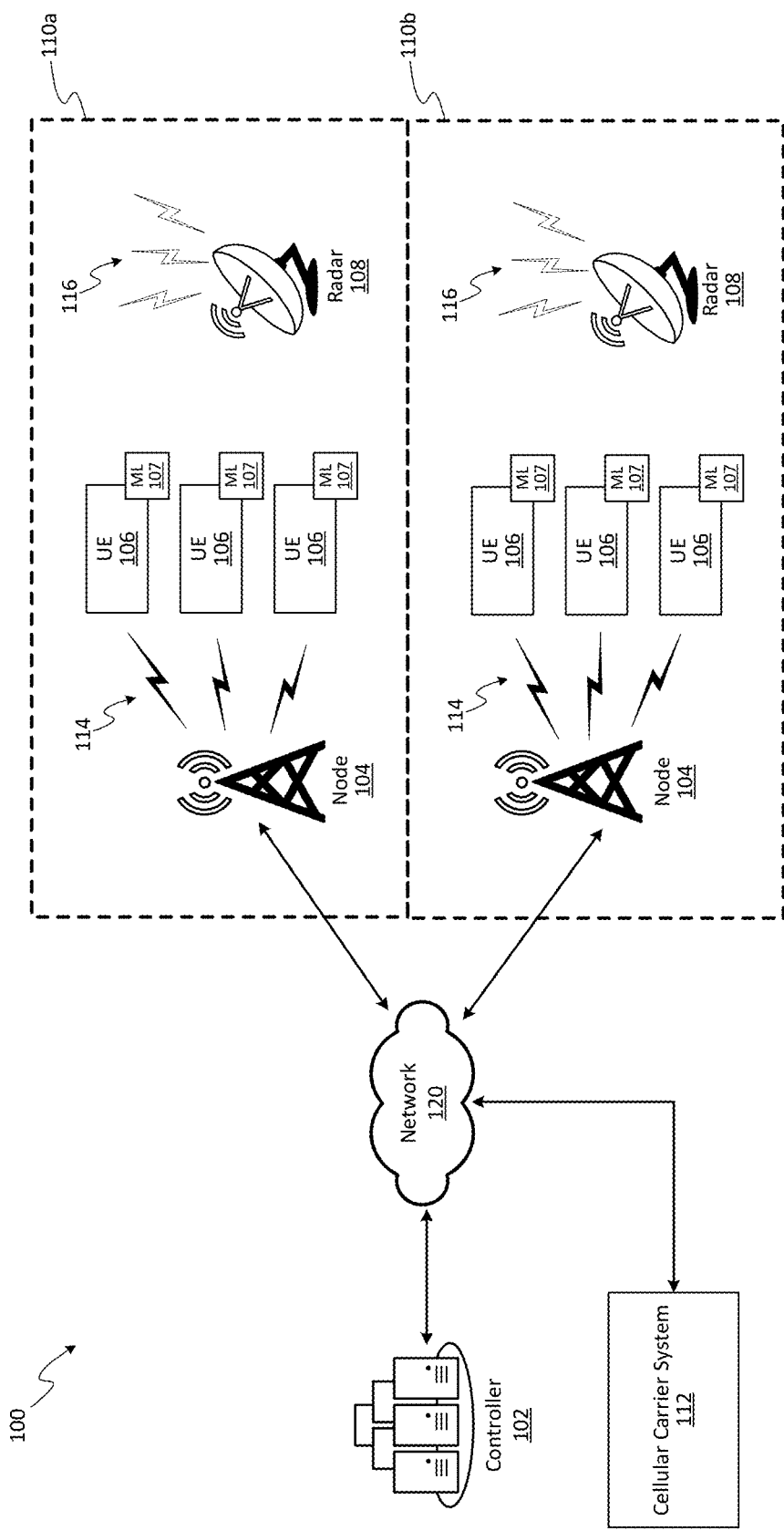
FIG. 1 illustrates a block diagram of an example system according to an aspect of the application.

Before explaining at least one embodiment of the application in detail, it is to be understood that the application is not limited in its application to the details of construction and to the arrangements of the components set forth in the following description or illustrated in the drawings. The application is capable of embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not for other embodiments.

Primary signal detection may be facilitated by the use of user equipment (UE) as distributed sensors. A disclosed approach may involve primary signal (e.g., radar) detection enhancements, e.g., using distributed machine learning at the UEs. For example, disclosed embodiments may distribute training and management of machine learning models. Such distributed machine learning training and management may be facilitated by a centralized controller. Deep unsupervised anomaly detection is an exemplary model, which may be trained and used for primary signal detection in this setting.

Disclosed techniques may implement deep unsupervised anomaly detection model training on the UEs. For example, locally relevant machine learning model parameters may be uploaded to the UEs based on various triggers. Additionally or alternatively, updated machine learning model parameters may be downloaded to the controller from the UEs based on various triggers. Additionally or alternatively, models trained by different UEs at the controller may be synchronized. Additionally or alternatively, anomaly detections from the UEs may be communicated to the controller upon execution of the trained models. Additionally or alternatively, anomaly detections received from the UEs may be analyzed by the controller to declare a presence of the primary signal (e.g., a radar signal).

In some embodiments, UE vendors may enable the herein-described operation in shared spectrum environments, including future 5G networks.

Disclosed techniques may take different machine learning approaches to solve known problems of primary signal detection. For example, primary signal detection may be performed using deep unsupervised learning anomaly detection (e.g., which may provide a cheaper solution and independency of previous data collection and labeling). This approach may be based on the learning algorithm's ability to construct a suitable representation of a typical, primary signal-free 5G (for example) environment at target locations based on continuous observation and sensing. For example, once the appropriate representation is learned, it may be used to detect significant deviations from normal, which may be caused by the presence of the primary signal, and tip and cue the follow-up data analytics to statistically confirm the detection and to determine the areas of impact. Some advantages of this approach may include: continuous online learning without the need for labeled data and retraining on new labels; low storage and processing requirements; ability to capture site-specific trends in the environment; and good generalization capability, i.e., robustness to data never previously seen. Unsupervised deep learning for anomaly detection may be performed, for example, using generative adversarial networks (GANs) and adversarial autoencoders.

A machine-learning assisted primary signal detection approach may include a continuous online learning of a representation model of a local 5G (for example) RF environment. For instance, instead of deploying a large number of dedicated sensors, disclosed techniques may use 5G UEs (e.g., and 5G-NR gNodeBs) to both sense and learn the environment in which they operate. This approach leverages the provided capabilities of the UEs. These UEs may have significant machine-learning optimized hardware, e.g., to efficiently perform deep learning training and inference. The UEs radio receivers may already be optimized to sense 5G bands. Communication channels to exchange training model coefficients and inference results may have sufficiently large capacity.

To continuously learn location-specific representation models of the environment using UEs, disclosed techniques may define one or more areas. For example, the areas may be defined using one or multiple criteria, such as cellular sector boundaries, user density, terrain features, administrative boundaries, etc. The model for each area may be generally managed by a central dynamic spectrum access controller connected to the network via the Internet protocol (IP). This controller manages corresponding model updates and distribution to the UEs, e.g., in each area. As UEs cross area boundaries, they may use preprogrammed location information to trigger uploading the UEs' latest model coefficients for the old area and replace them with coefficients for the new area. The coefficients or model for the new area may be received from the controller. The UEs may then continue training the up-to-date model using new measurements of the 5G environment, and the UEs may also use the model to detect anomalies that may be indicative of the primary signals. UEs belonging to the same area may have a procedure to synchronize their models either directly through a gNodeB or through the controller.

The unsupervised environment representation model described herein may be trained in such a way that the anomalous events, when detected, are associated with the probability metric reported to the controller. The controller may collect all reported anomaly detection probabilities and analyze them across all active UEs in each area (e.g., a fraction of UEs detecting anomaly versus a total number) and across all areas. The controller may then make a determination as to the presence of the primary signal and/or the likely area of operation of the primary signals and/or the primary signal source(s). The controller may make one or more predictions of the likely future impact, e.g., by observing the trends in the distribution of reported anomaly detections.

FIG. 1 is a diagram of an example system 100 in which one or more disclosed embodiments may be implemented. The system 100 includes a controller 102 communicatively connected via a network 120 to one or more nodes 104 (e.g., cellular nodes, also referred to as base stations). The nodes 104, in turn, are in wireless communication, via secondary signals 114, with one or more UEs 106. Each UE 106 is configured with a machine learning model 107 (variously referred to simply as a model) to facilitate radio signal anomaly and/or primary signal detection. The controller 102, generally speaking, may coordinate the activities and data exchanges between the various UEs 106, at least as pertains to anomaly and primary signal detection. The controller 102 may additionally or alternatively determine that a primary signal 116 is present in a particular area. A cellular carrier system 112 is also communicatively connected to the various nodes 104 via the network 120 and may facilitate the cellular service functions of the UEs 106. The controller 102 and the cellular carrier system 112 may be associated with a common entity, such as a cellular service provider. The controller 102 may be integrated with a node 104 to form a singular unit. For example, a node 104 may comprise the controller 102.

A UE 106 may comprise a computing device configured to communicate via cellular communication, such as via a 5G/NR or 4G/LTE network, or more generally, via dynamic spectrum sharing techniques. A UE 106 may comprise a mobile device, such as a cellular phone (e.g., a smart phone) or a tablet computer configured with cellular capabilities. A UE 106 may also include less mobile computing devices, such as a desktop or laptop configured with a cellular adaptor. It is contemplated that a UE 106 may be generally configured and used, at least from the perspective of the user, according to the device's typical and ordinary purposes, notwithstanding the primary signal detection functions disclosed herein. In other words, it is contemplated that a UE 106 is not deployed with the main purpose of primary signal detection, but rather such primary signal detection functions are secondary to the ordinary uses of the device. As noted, a UE 106 may be configured with a machine learning component directed to anomaly detection in the UE's 106 RF environment. The machine learning model 107 may comprise an application or other software executing (e.g., in the background) on a UE 106. The RF signals (e.g., cellular signals) transmitted and received by a UE 106 may be considered secondary signals.

The system 100 further defines a first area 110a and a second area 110b (or generically, area(s) 110) for use in primary signal detection techniques. The first and second areas 110a,b may be predefined. As noted above, the first and second areas 110a,b may be defined according to cellular sector boundaries, user density, terrain features, administrative boundaries, and/or other criteria. The first and second areas 110a,b are adjacent in FIG. 1, although this may not always be the case. The first and second areas 110a,b each include one or more nodes 104 for wireless communication with one or more respective UEs 106. A node 104 may comprise a cellular base station, cell tower, or the like. Although FIG. 1 depicts each of the first and second areas 110a,b as including a single node 104, the disclosure is not so limited and an area 110 may instead include multiple nodes 104 or no nodes 104 at all. For example, a node 104 may service UEs 106 in multiple areas 110. In an example in which areas 110 are defined according to cellular sector, each area 110 may include a single node 104. Similarly, an area 110 may include any number (including zero) of UEs 106. In addition, it is contemplated that UEs 106 may move freely between areas 110, including between the coverage areas of the nodes 104. A node 104 may function to pass a machine learning model 107 (and/or parameters thereof) from one UE 106 to another UE 106.

An area 110 may include one more radar stations 108. A radar station 108 may be considered an example primary user that operates via (e.g., sends and/or receives) primary signals. The radar stations 108 described with respect to FIG. 1 and elsewhere are only one example of a primary user, and the term "primary user" may be used to describe other types of systems, devices, or other technologies that send and receive primary signals. The first and second areas 110a,b in FIG. 1 each include a single radar station 108, although it is also contemplated that an area 110 may include no radar stations 108 or multiple radar stations 108. For example, there may be only a single radar station 108 among a plurality of areas 110. The single radar station 108, however, may cause primary signals in additional areas 110 besides the area 110 in which the single radar station 108 is located.

As noted, the controller 102 may generally coordinate and manage the primary signal detection functions and activities in the system 100, including sending and receiving machine learning models (e.g., model parameters) and anomaly detection data to and/or from the various UEs 106 (e.g., via an appropriate node 104).

For example, the controller 102 may receive data from a UE 106 indicating a detected anomaly in the UE's 106 RF environment (e.g., in the UE's 106 area 110), along with a representation of the RF environment and/or associated signal parameters. Based on the anomaly detection data from the UE 106, as well as, potentially, similar anomaly detection data from other UEs 106, the controller 102 may determine that a primary signal is present in the area 110. The controller 102 may additionally or alternatively receive a most up-to-date machine learning model from a UE 106 in a particular area 110 and propagate that model to one or more other UEs 106 in the area 110, such as a UE 106 that just recently entered the area 110. The controller 102 may additionally or alternatively build, based on anomaly detection data received from UEs 106, a machine learning model for determining whether one or more anomalies detected by the UEs are indicative of a primary signal in the associated area 110.

Figure 2:
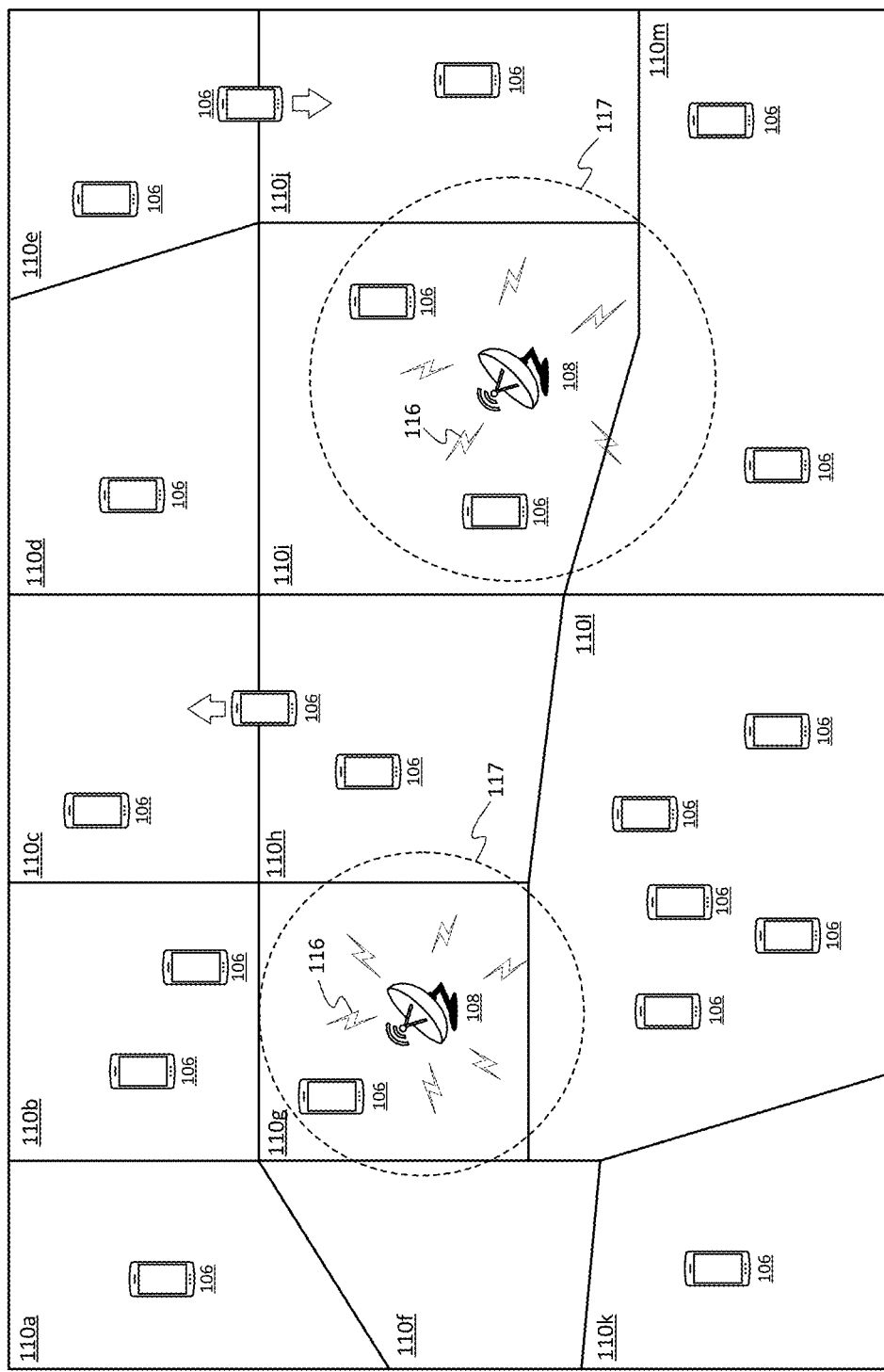
FIG. 2 illustrates a map diagram of an example plurality of areas according to an aspect of the application.

FIG. 2 is an example map diagram 140 showing a large-scale area in which the disclosed techniques may be implemented. This large-scale area is partitioned into a plurality of areas 110a-m, which may be conceptually similar to the areas 110a,b shown in FIG. 1. Like the areas 110a,b in FIG. 1, the areas 110a-m may be predefined according to various criteria, such as cellular sector boundaries, user density, terrain features, administrative boundaries, etc. One or more UEs 106 (or none) may be located within each of the areas 110a-m at any given time. The positioning of the UEs 106 may be fluid, with some UEs 106 moving in and out of the various areas 110a-m according to their typical usage. For example, a UE 106 may move from one cellular sector to another cellular sector. A UE 106 is seen in FIG. 2 moving from the area 110*h* to the area 110*c* and another UE 106 is seen in FIG. 2 moving from the area 110*e* to the area 110*j*. Other UEs 106 may generally stay within a single area 110. The nodes 104 shown in FIG. 1 have been omitted from FIG. 2 for clarity of illustration.

One or more of the areas 110*a-m* (e.g., the areas 110*g* and 110*i*) may include one or more radar stations 108, which may intermittently produce primary signals 116. The approximate ranges of the primary signals from the respective radar stations 108 are represented by the ranges 117 in FIG. 2. It may be observed that the range 117 of the primary signals 116 from a radar station 108 may not encompass all of the area 110 in which that source radar station 108 is located and/or the range 117 may cross over into additional areas 110. This may potentially enhance the system's ability to detect a primary signal since the UEs 106 within area(s) 110 in which the primary signal range 117 covers most of the area 110 may report an anomaly detection associated with a greater confidence level or probability while the UEs 106 within other area(s) in which the primary signal range 117 covers a minority of the area 110 may report an anomaly detection associated with a lesser confidence level or probability. A confidence level or probability may be, at least in part, a function of a distance of a UE 106 from a primary signal source. The variable confidence levels or probabilities may be used by the controller as one factor in determining the presence of a primary signal in an area 110.

Figure 3:
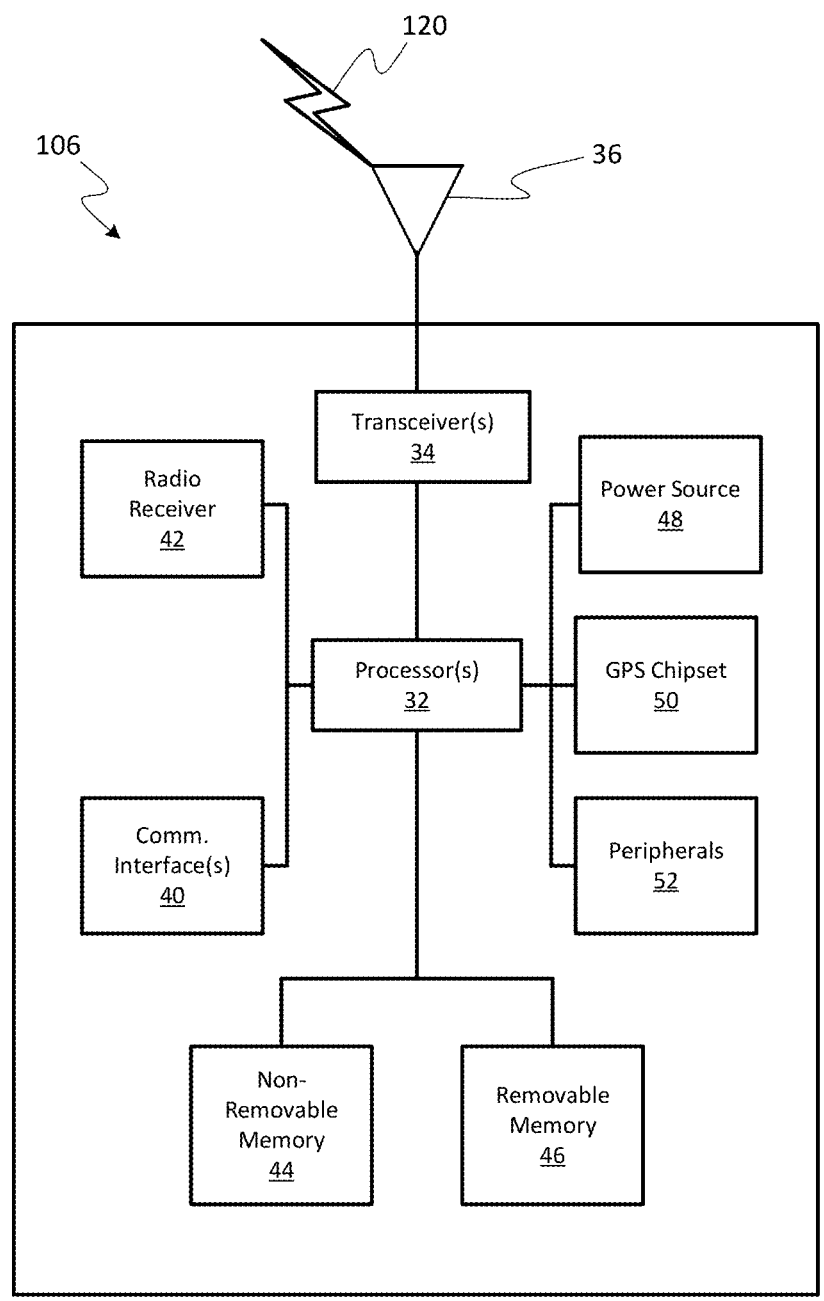
FIG. 3 illustrates a block diagram of an example user equipment device according to an aspect of the application.

FIG. 3 is a block diagram of an exemplary hardware/software architecture of a UE 106 of FIG. 1. As shown in FIG. 3, the UE 106 may include one or more processors 32, a communication interface 40, a radio receiver 42, non-removable memory 44, removable memory 46, a power source 48, a global positioning system (GPS) chipset 50, and other peripherals 52. The UE 106 may also include communication circuitry, such as one or more transceivers 34 and a transmit/receive element 36. It will be appreciated that the UE 106 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., the memory 44 and/or the memory 46) of the UE 106 in order to perform the various required functions of the UE 106. The processor 32 may run radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., the transceiver 34, the transmit/receive element 36, the radio receiver 42, and the communication interface 40). The processor 32, through the execution of computer executable instructions, may control the communication circuitry in order to cause the UE 106 to communicate with other components of the system, such as the node(s) 104, the cellular carrier system 112, and the controller 102 of FIG. 1. The processor 32 may further control the communication circuitry to detect and capture radio spectrum and radio signal data via the transmit/receive element 36 and the radio receiver 42. The radio receiver 42 may comprise a software-defined radio (SDR) receiver. The radio receiver 42 may define one or more channels, such as one or more channels to scan a frequency spectrum for any radio signals associated with a primary user and one or more channels to capture identified radio signal data associated with a primary user.

The transmit/receive element 36 may be configured to receive (i.e., detect) a primary signal (e.g., from a radar station) in the UE's 106 RF environment. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals. The transceiver 34 and/or transmit/receive element 36 may be integrated with, in whole or in part, the communication interface(s) 40, particularly wherein a communication interface 40 comprises a wireless communication interface. The communication interface(s) 40 additionally or alternatively may comprise one or more wired communication interfaces.

The processor 32 may access information from, and store data in, any type of suitable memory, such as the non-removable memory 44 and/or the removable memory 46. For example, the processor 32 may store captured radio signal data (e.g., FA packets and digital I&Q data) in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a USB drive, a secure digital (SD) memory card, and the like. In other embodiments, the processor 32 may access information from, and store data in, memory that is not physically located on the UE 106. The non-removable memory 44, the removable memory 46, and/or other associated memory may comprise a non-transitory computer-readable medium configured to store instructions that, when executed, effectuate any of the various operations described herein.

The processor 32 may receive power from the power source 48 and may be configured to distribute and/or control the power to the other components in the UE 106. The power source 48 may be any suitable device for powering the UE 106. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like. The power source 48 may be additionally or alternatively configured to receive power from an external power source. The processor 32 may also be coupled to the GPS chipset 50, which is configured to provide location information regarding the location of the UE 106. It will be appreciated that the UE 106 may acquire location information by way of any suitable location-determination technique while remaining consistent with an embodiment.

Figure 4:
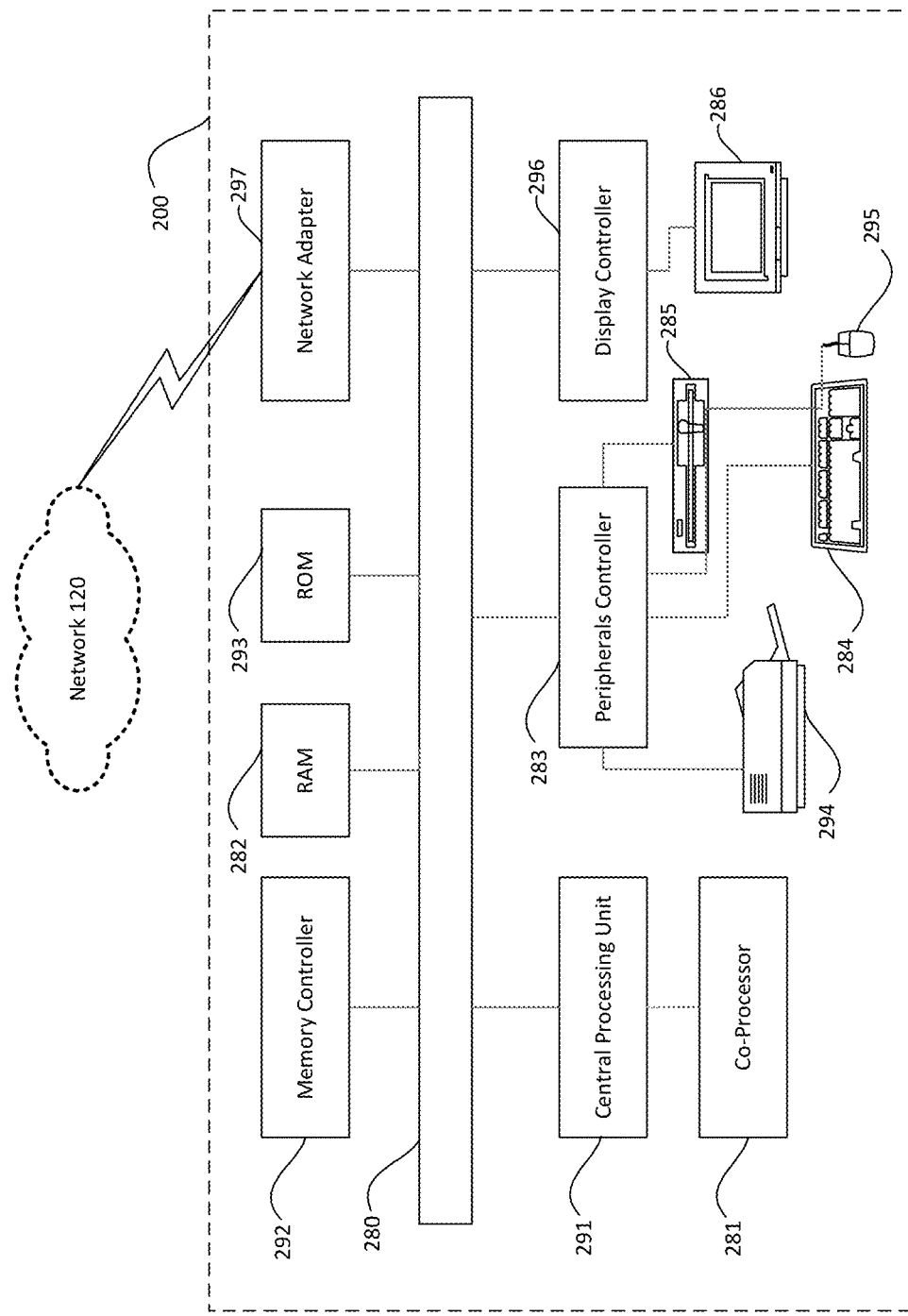
FIG. 4 illustrates a block diagram of an example computing system according to an aspect of the application.

FIG. 4 is a block diagram of an exemplary computing system 200 which may be used to implement components of the system, including a UE 106, a node 104, and/or the controller 102 of FIG. 1. The computing system 200 may comprise a computer or server and may be controlled primarily by computer-readable instructions (e.g., stored on a non-transitory computer-readable medium), which may be in the form of software, wherever, or by whatever means such software is stored or accessed. Such computer-readable instructions may be executed within a processor, such as a central processing unit (CPU) 291, to cause the computing system 200 to do work. In many known workstations, servers, and personal computers, the central processing unit 291 is implemented by a single-chip CPU called a microprocessor. In other machines, the central processing unit 291 may comprise multiple processors. A coprocessor 281 is an optional processor, distinct from the main CPU 291 that performs additional functions or assists the CPU 291. The CPU 291 and/or the coprocessor 281 may receive anomaly detection data from a UE 106 to detect a primary signal in the UE's 106 RF environment.

In operation, the CPU 291 fetches, decodes, executes instructions, and transfers information to and from other resources via the computer's main data-transfer path, system bus 280. Such a system bus connects the components in the computing system 200 and defines the medium for data exchange. The system bus 280 typically includes data lines for sending data, address lines for sending addresses, and control lines for sending interrupts and for operating the system bus 280. An example of such a system bus 280 may be the PCI (Peripheral Component Interconnect) bus or PCI Express (PCIe) bus.

Memories coupled to the system bus 280 include random access memory (RAM) 282 and read only memory (ROM) 293. Such memories include circuitry that allows information to be stored and retrieved. The RAM 282, the ROM 293, or other associated memory may comprise a non-transitory computer-readable medium configured to store instructions that, when executed, effectuate any of the various operations described herein. The ROMs 293 generally contain stored data that cannot easily be modified. Data stored in the RAM 282 may be read or changed by the CPU 291 or other hardware devices. Access to the RAM 282 and/or the ROM 293 may be controlled by a memory controller 292. The memory controller 292 may provide an address translation function that translates virtual addresses into physical addresses as instructions are executed. The memory controller 292 may also provide a memory protection function that isolates processes within the system and isolates system processes from user processes. Thus, a program running in a first mode may only memory mapped by its own process virtual address space; it cannot access memory within another process's virtual address space unless memory sharing between the processes has been set up.

In addition, the computing system 200 may comprise a peripherals controller 283 responsible for communicating instructions from the CPU 291 to peripherals, such as a printer 294, a keyboard 284, a mouse 295, and a disk drive 285. A display 286, which is controlled by a display controller 296, is used to display visual output generated by the computing system 200. Such visual output may include text, graphics, animated graphics, and video. Visual output may further comprise a GUI. The display 286 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 200 may comprise communication circuitry, such as a network adaptor 297, that may be used to connect the computing system 200 to a communications network, such as the network 120 of FIG. 1, to enable the computing system 200 to communicate with other components of the system and network.

Figure 5:
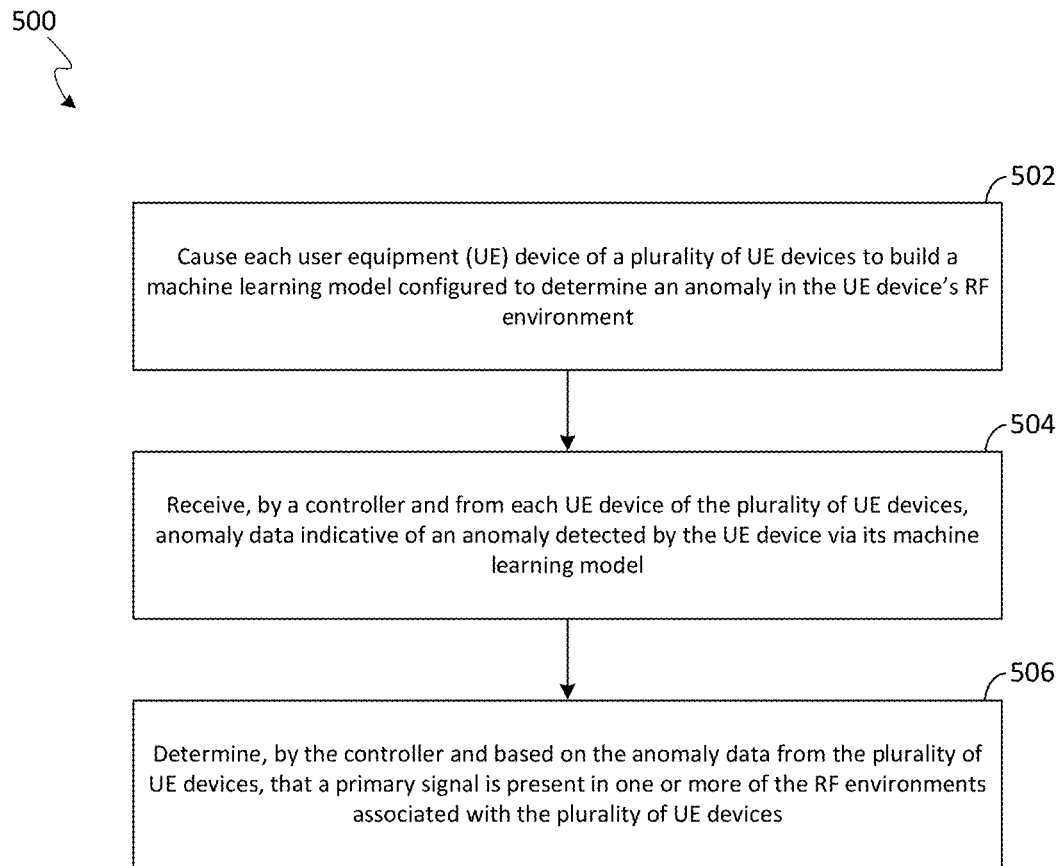
FIG. 5 illustrates a method flow chart of an example method according to an aspect of the application.

FIG. 5 illustrates a flow diagram 500 of an example method for determining a presence of a primary signal, such as a primary signal generated by a radar station. The primary signal may be associated with one or more RF environments and/or predefined areas. The method of FIG. 5 shall be discussed with further reference to a system 600 shown in the system flow diagram of FIG. 6.

The system 600 is similar in at least some aspects to the system 100 of FIG. 1. The system 600 comprises a plurality of UEs 606 (e.g., the UEs 106 of FIG. 1) in a predefined area 610, including a first UE 606*a*, a second UE 606*b*, and a third UE 606*c*, and a controller 602 (e.g., the controller 102 of FIG. 1) in communication with the UEs 606. Each of the UEs 606 is configured to build (e.g., determine) a machine learning (ML) model 607 (e.g., a machine learning model 107 of FIG. 1) for detecting any anomalies in the UE's 606 RF environment.

Figure 6:
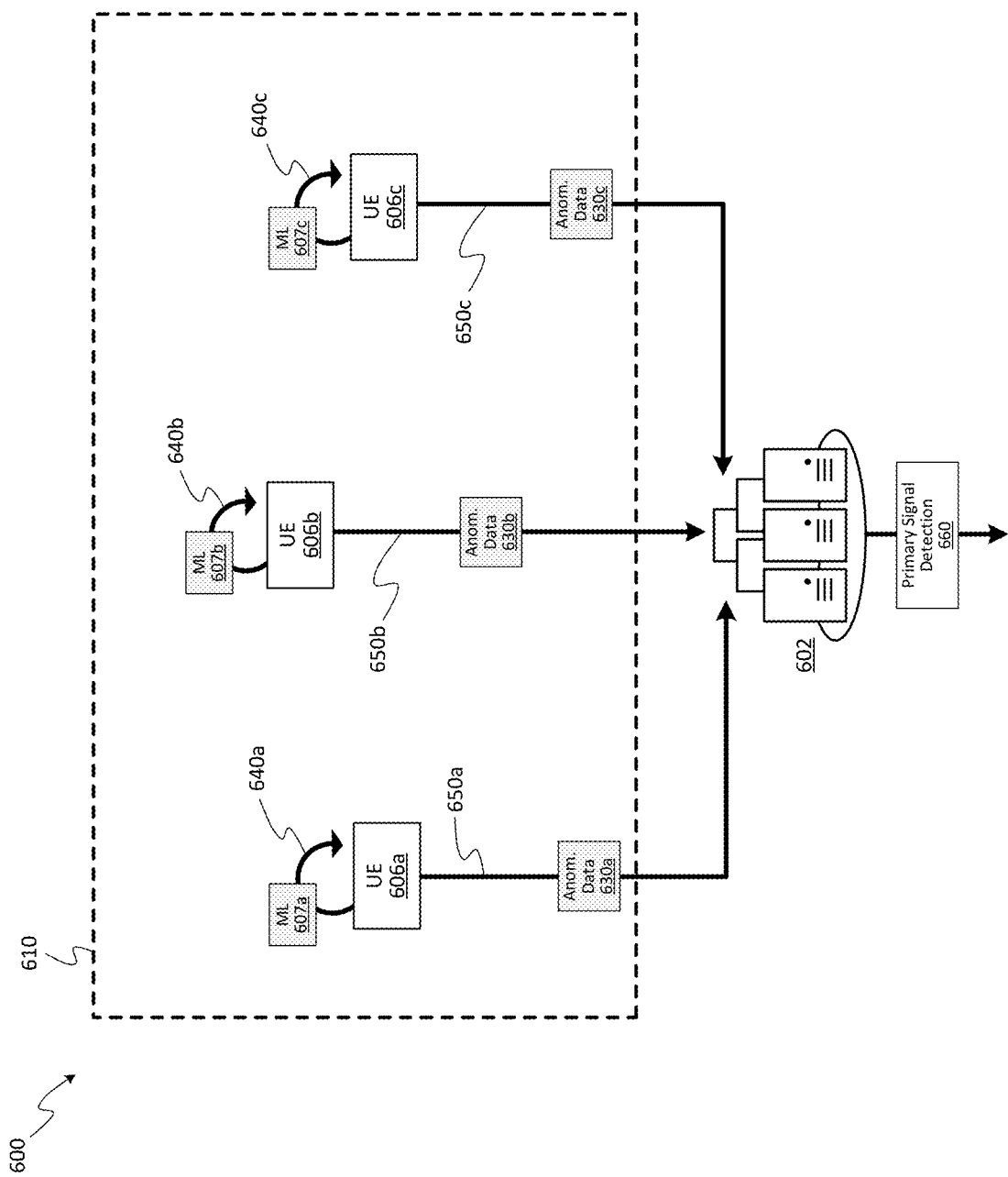
FIG. 6 illustrates a system flow diagram relating to the method flow chart illustrated in FIG. 5 according to an aspect of the application.

One or more nodes (e.g., the nodes 104 of FIG. 1) for facilitating communication with the UEs 606 are not shown in FIG. 6 for clarity of illustration. However, it is noted that the various anomaly data received by the controller 602 from the UEs 606, as well as other communications exchanged therebetween, may be received via one or more nodes (e.g., base stations) configured to communicate with the UEs 606. For example, a node may be configured to receive anomaly data from a UE 606 and transmit the anomaly data to the controller 602 for processing and analysis. A node may be located within the predefined area 610 or external to it.

Although not depicted in FIG. 6 one way or the other, the system 600 may include one or more radar stations (e.g., the radar stations 108 of FIG. 1) or other potential source of a primary signal. For example, there may be a radar station within the area 610 that intermittently generates a primary signal within the area 610, which is preferably detected according to the disclosed techniques. Additionally or alternatively, there may be a radar station located outside of the area 610 that may nonetheless intermittently generate a primary signal that crosses into the area 610, which is also preferably detected according to the disclosed techniques. Or there may be (unknowingly) no nearby radar stations that intermittently generate a primary signal within the area 610, in which case the disclosed techniques may preferably determine that no primary signal is present.

At step 502 in FIG. 5, each UE 606 of the plurality of UEs 606 is caused (e.g., by the controller 602) to build (e.g., determine) an ML model 607 configured to determine an anomaly (e.g., an anomalous signal or waveform) in the UE's 606 RF environment. An ML model 607 may comprise or operate on the basis of one or more machine learning parameters. "Anomalous" here may be relative to the expected signals and/or waveforms (and attributes thereof) encountered by the UEs 606 in their ordinary course of operation, such as those used in a 5G/NR or 4G/LTE network. As used in this context, building an ML model 607 may include building an ML model 607 from scratch or further training an existing ML model 607. For example, the first UE 606*a* builds a first ML model 607*a*, the second UE 606*b* builds a second ML model 607*b*, and the third UE 606*c* builds a third ML model 607*c*. The ML models 607*a-c* may be trained on an ongoing basis, as indicated by the respective arrows 640*a-c*. As a UE 606 moves about the area 610, the UE 606 may continuously collect (e.g., capture or determine) RF data associated with a UE's 606 instant RF environment and the collected RF data may be used to train the ML model 607. Such movement may be the result of the ordinary movement of the UE's 606 user.

The RF data may comprise one or more RF representations of the RF environment, with various parameters and attributes thereof including sample RF waveforms, signal amplitude, signal phase, signal timing, and/or signal framing (e.g., frame duration). The RF data may be used to build or update an ML model 607. The RF data may also be input to an ML model 607 to detect any anomalies in that RF data.

It will be noted that a UE 606 may in practice have two parallel ML models 607. One may be a set "in-use" model that is used to determine any anomalies in collected RF data, while the second may be an "in-training" model that is continuously updated as new RF data is collected. At various points, the second model (or another model) may replace the first model as the "in-use" model, and the UE 606 may then begin training yet another model (e.g., as a new model from scratch or as a continuation of the second (or other) model). However, for ease of description, the "in-use" model and "in-training" model shall be referred to collectively as a single ML model 607, unless clearly indicated otherwise.

At step 504, the controller 602 receives, from each UE 606 of the plurality of UEs 606, anomaly data 630 indicative of an anomaly (e.g., a radio signal anomaly) detected by the UE 606 via its ML model 607. For example, as indicated by the arrow 650a, the controller 602 receives anomaly data 630a from the first UE 606a. As indicated by the arrow 650b, the controller 602 receives anomaly data 630b from the second UE 606b. Finally, as indicated by the arrow 650c, the controller 602 receives anomaly data 630c from the third UE 606c. Anomaly data 630 may comprise one or more waveform representations of a signal that was determined (e.g., subject to a probability metric) to be anomalous. The waveform representation may be down-converted, such as a digital representation. The anomaly data 630 may further indicate one or more attributes of the waveform(s) and/or signal, such as amplitude, phase, timing, and framing (e.g., frame duration). The anomaly data 630 may indicate a time and location (e.g., GPS coordinates) associated with the anomalous signal. For example, the anomaly data 630 may indicate the location of the UE 606 when it captured the RF data that was subsequently found to include the anomaly, as well as the time that the RF data was captured. The anomaly data 630 may further comprise a probability metric that reflects a probability (e.g., confidence) that the detected anomaly is in fact an anomaly and/or a probability (e.g., confidence) that the detected anomaly is indicative of a primary signal.

At step 506, the controller 602 determines, based on the anomaly data received from the plurality of UEs 606, that a primary signal is present in one or more RF environments associated with the plurality of UEs 606 (represented in FIG. 6 as a primary signal detection 660 reported by the controller 602). For example, the controller 602 may determine that the primary signal is present in one or more respective RF environments of the UEs 606a-c based on the respective anomaly data 630a-c from the UEs 606a-c. The one or more RF environments may be associated with the area 610 or portion thereof. Determining the presence of the primary signal may comprise determining that the primary signal is present in an RF environment associated with the area 610 and/or at least a portion of the area 610. Determining the presence of the primary signal may be further based on the respective probability metrics indicated in the anomaly data.

Determining the presence of the primary signal by the controller 620 may be further based on the respective locations and/or timing associated with the various sets of anomaly data 630 received from the UEs 606. For example, the controller 620 may identify a pattern (e.g., with respect to time and/or location) in the anomalies indicated in the anomaly data 630. The anomaly data 630 may be used to determine a location of the primary signal source based on, for example, the probability metrics indicated in the anomaly data 630 and/or the various attributes of the anomalous waveforms indicated in the anomaly data 630. For example, a location associated with anomaly data 630 having a high probability metric may be closer to the primary signal source than a location associated with anomaly data 630 having a low probability metric.

Determining the presence of the primary signal by the controller 602 may be accomplished via machine learning at the controller 602. In this sense, the primary signal detection techniques may include a two-level machine learning framework, with one level being at the UEs 606 to determine an anomaly in an RF environment and a second level being at the controller 602 to determine whether the anomaly data 630 indicates a presence of a primary signal. The ML model at the controller 602 to determine a presence of a primary signal may be built based on not only the anomaly data 630 from the UEs 606 in the instant area 610 but also respective sets of anomaly data 630 associated with other areas. The controller 602 may use ML techniques such as time series analysis or other statistical analysis to determine the presence of a primary signal.

If the controller 602 does determine the presence of a primary signal in one or more of the UE's 606 respective RF environments (e.g., the RF environment associated with the area 610), the controller 602 may cause the UEs 606 in the area (or at least a portion thereof) to switch their respective operating frequency spectrums to one or more other frequency spectrums that do not interfere with the primary signal. The UEs 606 and the controller 602 may continue their primary signal detection functions despite the fact that a primary signal was detected. For example, the UEs 606 may continue to collect RF data, train their respective ML models 607, and send anomaly data 630 to the controller 602. The controller 602 may continue to analyze the anomaly data 630 to determine a presence of a primary signal. For example, the controller 602 may determine that the primary signal is still present. Or the controller 602 may determine that the primary signal is no longer present, in which case the controller 602 may cause the UEs 606 to resume operation in their initial frequency spectrum.

Figure 7:
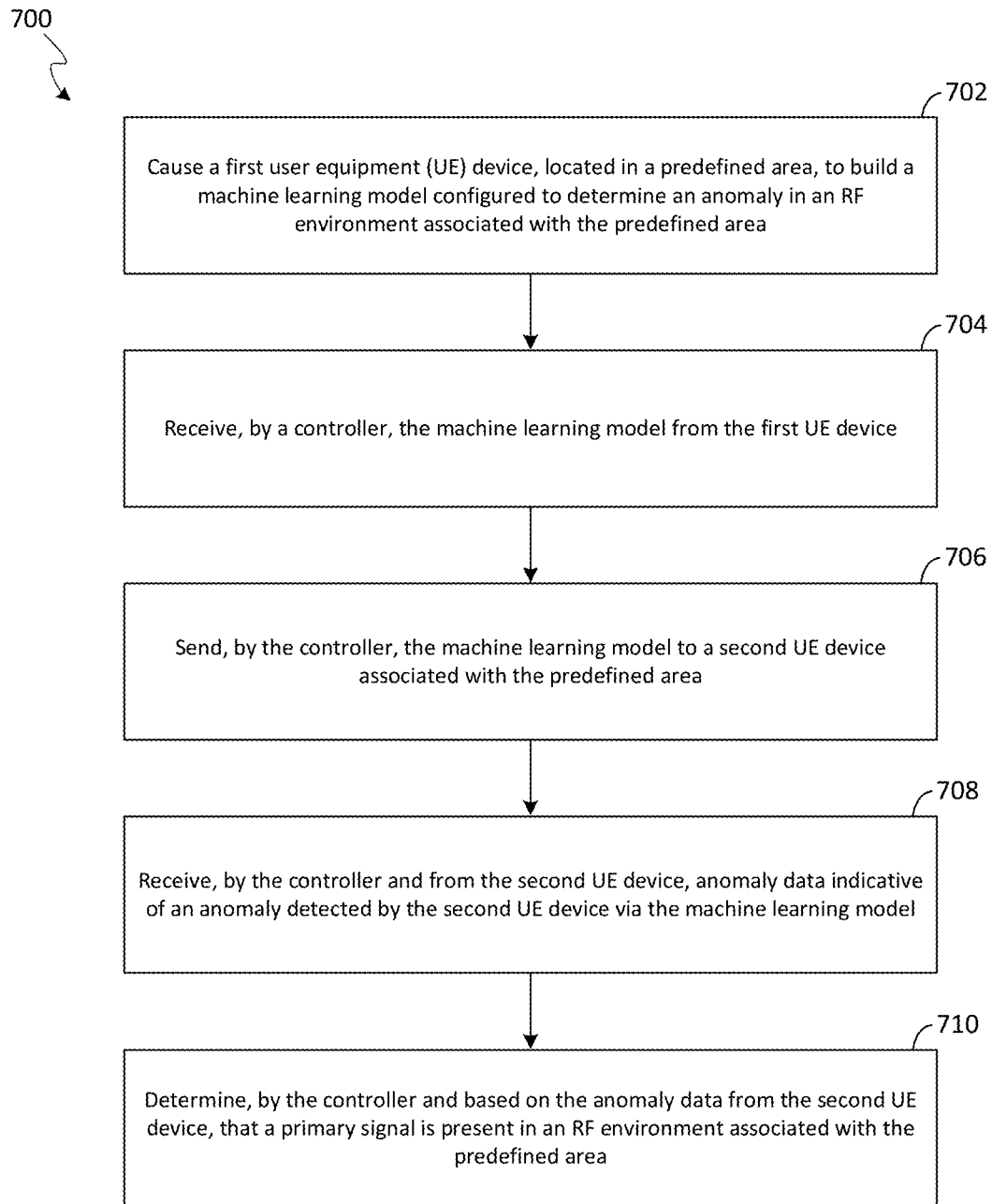
FIG. 7 illustrates a method flow chart of an example method according to an aspect of the application.

FIG. 7 illustrates a flow diagram 700 of an example method for synchronizing ML models between UEs in a predefined area, and for further determining a presence of a primary signal, such as a primary signal generated by a radar station. The primary signal may be detected in one or more respective RF environments associated with the UEs and/or the predefined area. The method of FIG. 7 shall be discussed with further reference to a system 800 shown in the system flow diagram of FIG. 8.

The system 800 is similar in at least some aspects to the system 100 of FIG. 1. The system 800 comprises a plurality of UEs 806 (e.g., the UEs 106 of FIG. 1) in a predefined area 810, including a first UE 806a, a second UE 806b, and a third UE 806c, and a controller 802 (e.g., the controller 102 of FIG. 1) in communication with the UEs 806. Each of the UEs 806 is configured to build a machine learning (ML) model 807 (e.g., a machine learning model 107 of FIG. 1) for detecting any anomalies in the UE's 806 RF environment. Although not depicted in FIG. 8 one way or the other, the system 800 may include zero or one or more radar stations (e.g., the radar stations 108 of FIG. 1) or other potential source of a primary signal. A primary signal detected in the area 810 may additionally or alternatively derive from a primary signal source outside of the area 810.

Figure 8:
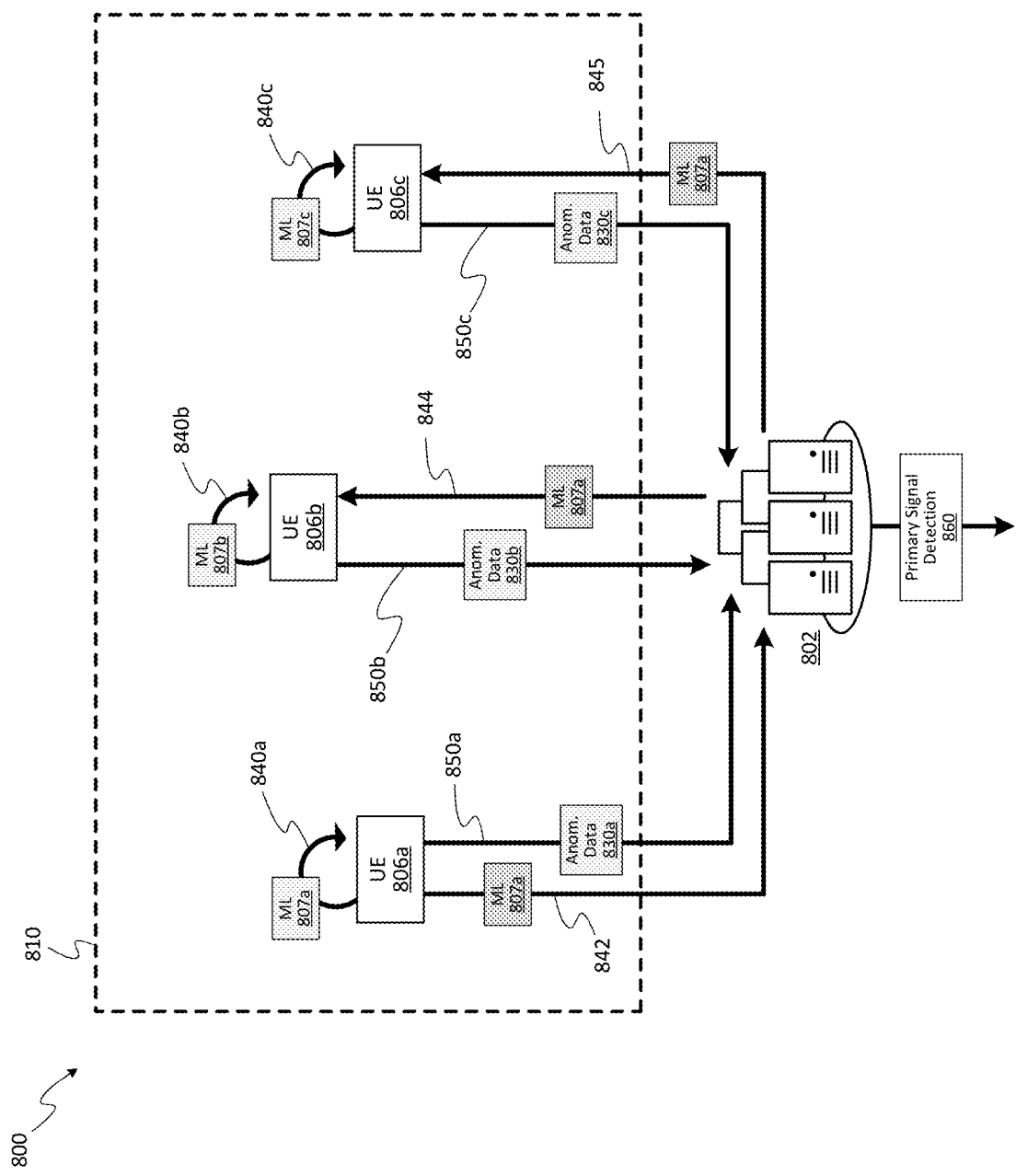
FIG. 8 illustrates a system flow diagram relating to the method flow chart illustrated in FIG. 7 according to an aspect of the application.

One or more nodes (e.g., the nodes 104 of FIG. 1) for facilitating communication with the UEs 806 are not shown in FIG. 8 for clarity of illustration. However, it is noted that the various data (e.g., anomaly data, ML models 807, machine learning parameters, or other data) exchanged between the controller 802 and the UEs 806 may be exchanged via one or more nodes (e.g., base stations) configured to communicate with the UEs 806. For example, a node may be configured to receive anomaly data from a UE 806 and transmit the anomaly data to the controller 802 for processing and analysis. A node may be similarly configured to receive an ML model 807 and/or machine learning parameter(s) from a UE 806 and transmit the ML model 807 and/or machine learning parameter(s) to the controller 802, and vice versa. Additionally or alternatively, a node may be configured to directly exchange anomaly data, ML model(s) 807, machine learning parameter(s), or other data between UEs 806 without going through the controller 802. A node may be located within the predefined area 810 or external to it.

At step 702 in FIG. 7, a first UE 806a, located in the area 810, is caused (e.g., by the controller 802) to build (e.g., determine) an ML model 807a configured to determine an anomaly in an RF environment associated with the area 810 (e.g., an RF environment associated with the first UE 806a and/or a UE 806 located in the area 810 generally). The ML model 807a may be initially trained with respect to anomalies in the first UE's 806a RF environment but may also be used by other UEs 806 in the area 810 for anomaly detection. The ML model 807a may be built (e.g., trained) by the first UE 806a based on RF data collected by the first UE 806a as it operates in the area 810, as described in further detail herein. The second and third UEs 806b,c may concurrently build respective ML models 807b,c. The ML models 807a-c may be trained on an ongoing basis, as indicated by the respective arrows 840a-c.

At step 704, the controller 802 receives the ML model 807a from the first UE 806a, as indicated by the arrow 842. For example, the ML model 807a may have been determined, according to various criteria, as the "best" ML model 807 associated with the area 810, and thus the other UEs 806 in the area 810 should use the ML model 807a. For example, the ML model 807a may have been subject to ongoing training for the longest period of time or may have been trained based on the largest body of RF data. Additionally or alternatively, the ML model 807a may have been determined as the "best" model based on the movement of the first UE 806a within the area 810 and/or the length of time that the first UE 806a has persisted in the area 810. For example, if the first UE 806a has moved most extensively throughout the area 810 while collecting RF data and/or has collected RF data in the area 810 for the longest time, this may suggest that the RF data used by the first UE 806a to determine the ML model 807a may be the most diverse and representative RF data for the area 810, and, by extension, the ML model 807a may be deemed as the best ML model 807 associated with the area 810.

At step 706, the controller 802 sends the ML model 807a to the second UE 806b associated with the area 810, as indicated by the arrow 844. Additionally or alternatively, the controller 802 may send the ML model 807a to the third UE 806c, as indicated by the arrow 845. The second UE 806b may receive the ML model 807a and replace its then-current ML model 807b with the ML model 807a. Sending the ML model 807a to the second UE 806b (or sending an ML model 807 generally) may comprise sending one or more parameters of the ML model 807a to the second UE 806b. Replacing the ML model 807b with the ML model 807a (or replacing an ML model 807 generally) may comprise integrating the one or more parameters of the ML model 807a into the ML model 807b (e.g., integrating the one or more parameters of the ML model 807a into one or more parameters of the ML model 807b). For example, the parameters of the ML model 807b on the second UE 806b may be updated, revised, or replaced based on the parameters from the ML model 807a from the first UE 806a. Example machine learning parameters may include weights in an artificial neural network, support vectors in a support vector machine, coefficients in a linear regression or logistic regression, or the mean and/or standard deviation of a distribution (e.g., Gaussian distribution).

Replacing the second UE's 806b ML model 807b with the ML model 807a (or replacing an ML model 807 generally) may comprise updating the ML model 807b based on the ML model 807a, or vice versa where the ML model 807a from the first UE 806a is updated based on the ML model 807b and the updated ML model 807a replaces the ML model 807b on the second UE 806b. Replacing the ML model 807b with the ML model 807a (or replacing an ML model 807 generally) may comprise combining the ML model 807b and the ML model 807a, with the combined ML model 807 replacing the ML model 807b on the second UE 806b. Updating an ML model 807 based on another ML model 807 or combining several ML models 807 may use averaging, weighted averaging, or exponential filtering of the model parameters.

Similarly, the third UE 806c may receive the ML model 807a and replace its then-current ML model 807c with the ML model 807a. The second UE 806b and the third UE 806c may subsequently use the ML model 807a for anomaly signal detection. The second UE 806b and the third UE 806c may further train the ML model 807a based on the respective RF data collected by the second UE 806b and the third UE 806c. In this manner, the various ML models 807 used by the UEs 806 within the area 810 may be synchronized. The ML models 807 may be synchronized according to various triggers. For example, synchronization may be triggered at regular time intervals. Additionally or alternatively, synchronization may be triggered when a new UE 806 enters the area 810. It will be noted that the ML model synchronization may be independent of any subsequent anomaly detection (e.g., receiving anomaly data from UEs 806) and/or primary signal detection (e.g., determining a presence of a primary signal). That is, steps 708 and 710 may be considered as optional with respect to steps 702, 704, and/or 706.

At step 708, the controller 802 receives, from the second UE 806b (indicated by the arrow 850b), anomaly data 830b indicative of an anomaly detected by the second UE 806b via the ML model 807a. The anomaly data 830b may indicate an anomaly in RF data (e.g., waveforms in the second UE's 806b RF environment) collected by the second UE 806b. Anomaly data 830 is described in further detail herein. It will be noted that the receiving the anomaly data 830b may be independent of any subsequent primary signal detection (e.g., determining a presence of a primary signal). That is, step 710 may be considered as optional with respect to steps 702, 704, 706 and/or 708.

At step 710, based on the anomaly data 830b, the controller 802 determines that a primary signal is present in an RF environment associated with the area 810 (and/or associated with the second UE 806*b*). Such determination is represented in FIG. 8 by a primary signal detection 860 reported by the controller 802. Based on determining the presence of the primary signal, the second UE 806*b* (as well as other UEs 806) may be forced to switch its operating frequency spectrum to one that will not cause interference with the primary signal. Determining that a primary signal is present in an RF environment is described in further detail herein.

The controller 802 may additionally or alternatively receive respective anomaly data 830*a,c* from the first and/or third UEs 806*a,c*, as indicated by the arrows 850*a,c*. The determination that a primary signal is present in the RF environment associated with the area 810 (and/or associated with the second UE 806*b* and/or further associated with the first and/or third UEs 806*a,c*) may be further based on one or more of the anomaly data 830*a,c*.

In an additional or alternative example embodiment, machine learning parameters of an ML model 807 may be exchanged between the various UEs 806 (instead of or in addition to the ML model 807 itself) to synchronize the ML models 807 associated with the area 810. For example, in step 704 of the method of FIG. 7, the controller 802 may receive one or more machine learning parameters of the first UE's 806*a* ML model 807*a* from the first UE 806*a*. In step 706, the controller 802 may send the one or more machine learning parameters of the ML model 807*a* to the second UE 806*b*. The second UE 806*b* may configure (e.g., update or revise), at least in part, the second UE's 806*b* ML model 807*b* with the one or more machine learning parameters of the ML model 807*a*. For example, the second UE 806*b* may replace one or more machine learning parameters of the ML model 807*b* with the received one or more machine learning parameters of the ML model 807*a*. The second UE 806*b* may determine the anomaly data 830*b* via the ML model 807*b* configured, at least in part, with the one or more machine learning parameters of the ML model 807*a*. Steps 708 and 710 may be performed as described above using this anomaly data 830*b* from the second UE 806*b*. An iteration of the method of FIG. 7 with respect to the third UE 806*c* and its ML model 807*c* may be performed in a similar manner.

Figure 9:
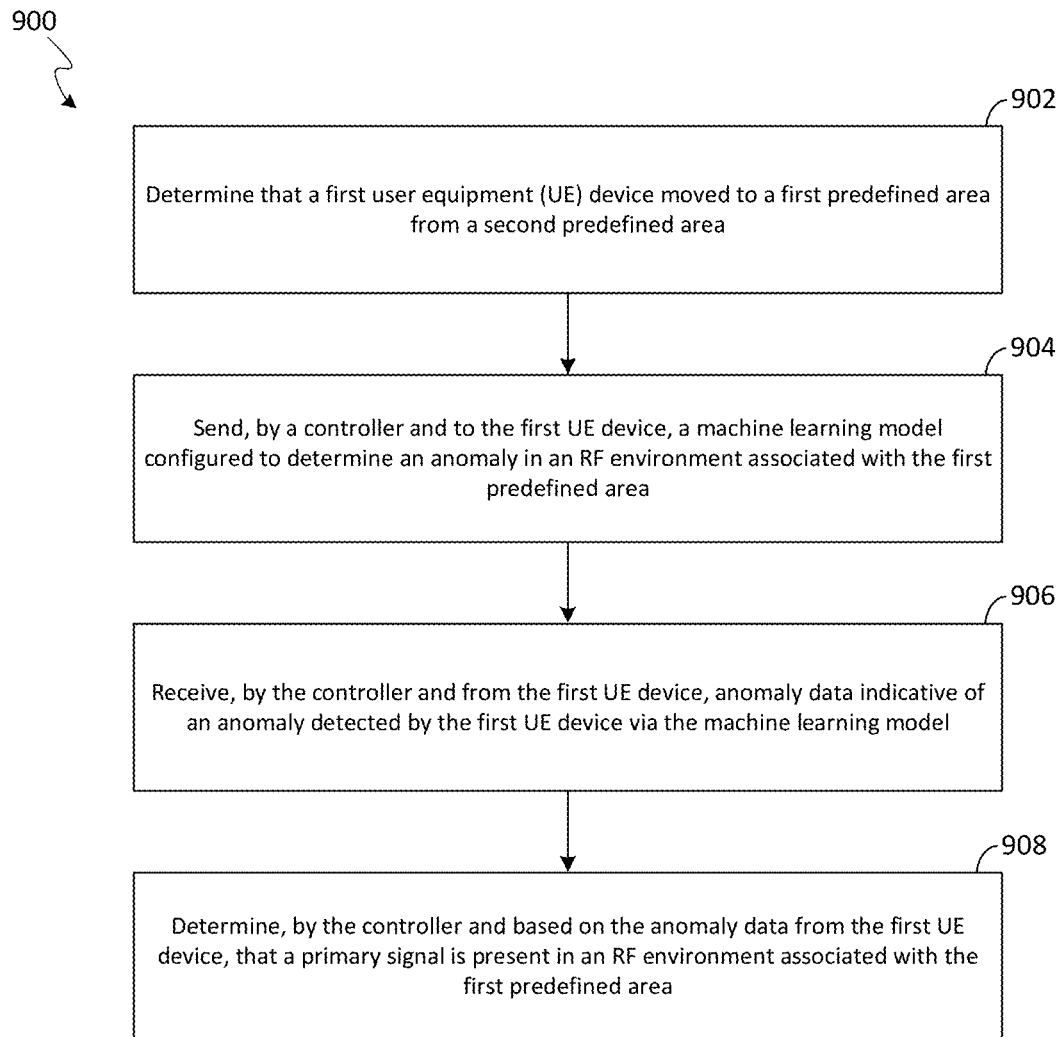
FIG. 9 illustrates a method flow chart of an example method according to an aspect of the application.

FIG. 9 illustrates a flow diagram 900 of an example method for managing distributed ML models as UEs move between predefined areas, and for further determining a presence of a primary signal, such as a primary signal generated by a radar station. The primary signal may be detected in one or more respective RF environments associated with the UEs and/or the predefined area. The method of FIG. 9 shall be discussed with further reference to a system 1000 shown in the system flow diagram of FIG. 10.

The system 1000 is similar in at least some aspects to the system 100 of FIG. 1. The system 1000 comprises a plurality of UEs 1006 (e.g., the UEs 106 of FIG. 1), with one or more UEs 1006 (e.g., a first UE 1006*a*, a second UE 1006*b*, and a third UE 1006*c*) located in a predefined first area 1010*a* and one or more UEs 1006 located in a predefined second area 1010*b*. One or more UEs 1006 may move from the second area 1010*b* to the first area 1010*a* (e.g., a fourth UE 1006*d*) and vice versa. Each of the UEs 1006 is configured to build a machine learning (ML) model 1007 (e.g., a machine learning model 107 of FIG. 1) for detecting any anomalies in the UE's 1006 respective RF environment. For example, the first through fourth UEs 1006*a-d* may build respective ML models 1007*a-d* on an ongoing basis, as indicated by the respective arrows 1040*a-d*. The UEs 1006 are in communication with a controller 1002 (e.g., the controller 102 of FIG. 1), such as via one or more nodes. Although not depicted in FIG. 10 one way or the other, the system 1000 may include zero or one or more radar stations (e.g., the radar stations 108 of FIG. 1) or other potential source of a primary signal. A primary signal source may be located in the first area 1010*a*, in the second area 1010*b*, or outside of these areas.

Figure 10:
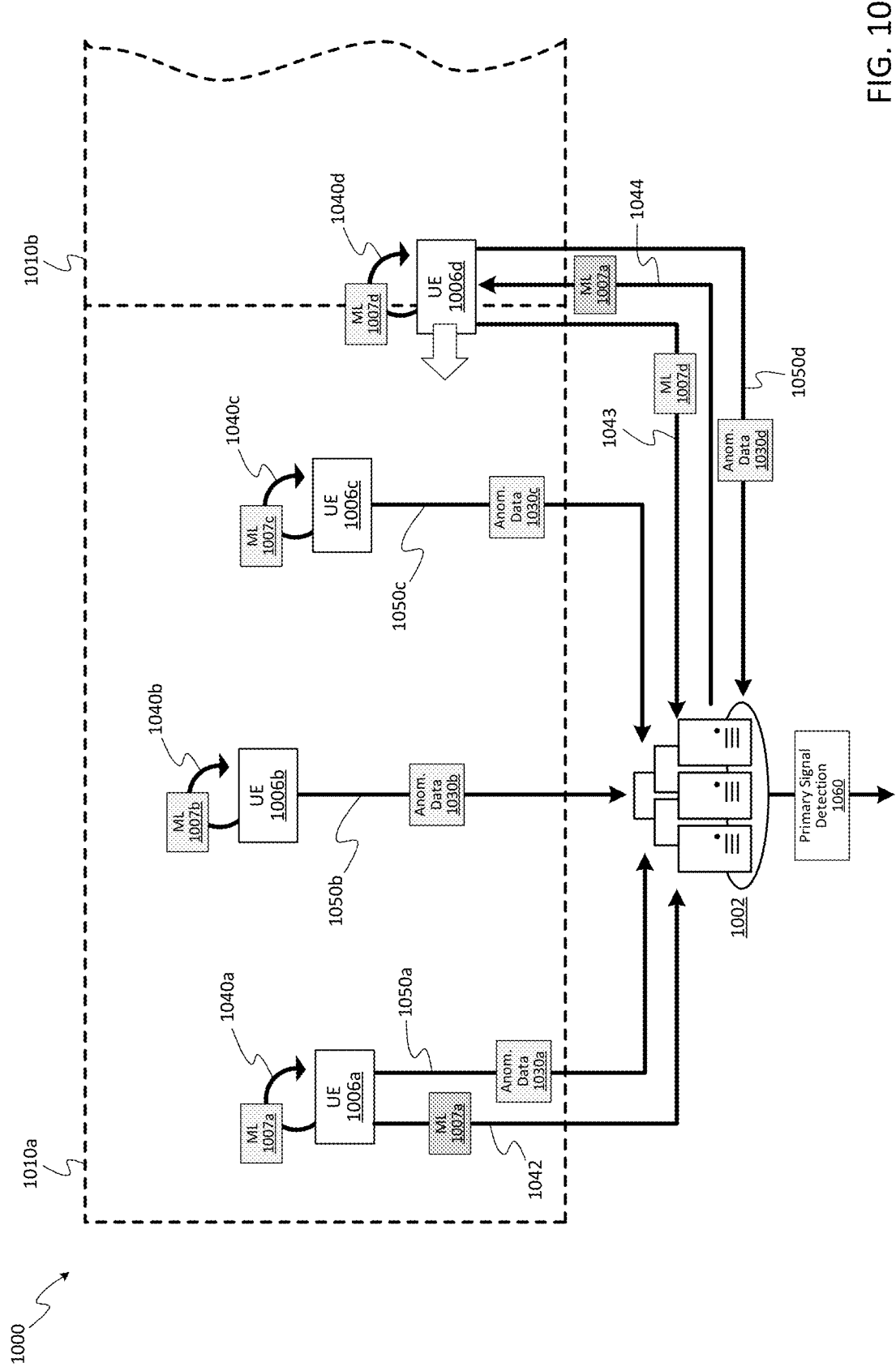
FIG. 10 illustrates a system flow diagram relating to the method flow chart illustrated in FIG. 9 according to an aspect of the application.

One or more nodes (e.g., the nodes 104 of FIG. 1) for facilitating communication with the UEs 1006 are not shown in FIG. 10 for clarity of illustration. However, it is noted the various data (e.g., anomaly data, ML models 1007, machine learning parameters, or other data) exchanged between the controller 1002 and the UEs 1006 may be exchanged via one or more nodes (e.g., base stations) configured to communicate with the UEs 1006. For example, a node may be configured to receive anomaly data from a UE 1006 and transmit the anomaly data to the controller 1002 for processing and analysis. A node may be similarly configured to receive an ML model 1007 and/or machine learning parameter(s) from a UE 1006 and transmit the ML model 1007 and/or machine learning parameter(s) to the controller 1002, and vice versa. Additionally or alternatively, a node may be configured to directly exchange anomaly data, ML model(s) 1007, machine learning parameter(s), or other data between UEs 1006 without going through the controller 1002. A node may be located within the first area 1010*a*, within the second area 1010*b*, or external to both of the first area 1010*a* and the second area 1010*b*.

At step 902, it is determined, such as by the controller 1002 and/or the fourth UE 1006*d*, that the fourth UE 1006*d* (i.e., a "first UE device" referred to in FIG. 9) moved to the predefined first area 1010*a* from the predefined second area 1010*b*. For example, the controller 1002 may determine that the fourth UE 1006*d* moved from a cellular sector associated with the second area 1010*b* to a cellular sector associated with the first area 1010*a*. The ML model 1007*d* of the fourth UE 1006*d* may be initially configured (e.g., at the time of moving to the first area 1010*a*) to detect an anomaly in an RF environment associated with the second area 1010*b*. The ML model 1007*d* may have been determined by the fourth UE 1006*d* while the fourth UE 1006*d* was operating in the second area 1010*b*.

At step 904, the controller 1002 sends the ML model 1007*a* to the fourth UE 1006*d* (i.e., the "first UE device" referred to in FIG. 9), as indicated by the arrow 1044 in FIG. 10. The ML model 1007*a* is configured to determine an anomaly in an RF environment associated with the first area 1010*a*. The ML model 1007*a* may have been built by the first UE 1006*a* associated with the first area 1010*a* (i.e., a "second UE device"). The controller 1002 may send the ML model 1007*a* to the fourth UE 1006*d* based on determining that the fourth UE 1006*d* moved into the first area 1010*a*. The ML model 1007*a* may replace the ML model 1007*d* initially built and/or used by the fourth UE 1006*d* for anomaly detection in the second area 1010*b*. As noted above, "replacing" the ML model 1007*d* with the ML model 1007*a* from the first UE 1006*a* may comprise updating the ML model 1007*d* based on the ML model 1007*a*, combining the ML model 1007*a* and the ML model 1007*d*, or integrating machine learning parameters from the ML model 1007*a* into the machine learning parameters of the ML model 1007*d* (e.g., the parameters of the ML model 1007*d* may be updated or replaced based on the parameters of the ML model 1007*a*).

The controller 1002 may have already had the ML model 1007*a* when the fourth UE 1006*d* moved to the first area 1010*a* (e.g., via the synchronization techniques described in relation to FIGS. 7 and 8) or the controller 1002 may have requested the ML model 1007a from the first UE 1006a after determining that the fourth UE 1006d crossed into the first area 1010a. The controller 1002 receiving the ML model 1007a from the first UE 1006a is indicated by the arrow 1042 in FIG. 10. The ML model 1007a may have been determined as the "best" ML model among the ML models 10071a-c. It will be noted that the controller 1002 sending the ML model 1007a to the fourth UE 1006d may be independent of any subsequent anomaly detection (e.g., receiving anomaly data from UEs 1006) and/or primary signal detection (e.g., determining a presence of a primary signal). That is, steps 906 and 908 may be considered as optional with respect to steps 902 and/or 904.

Based on the fourth UE 1006d moving into the first area 1010a and/or based on the fourth UE 1006d receiving the ML model 1007a from the controller 1002, the fourth UE 1006d may send its ML model 1007d to the controller 1002, as indicated by the arrow 1043 in FIG. 10. Although the fourth UE 1006d moves out of the second area 1010b, the ML model 1007d may still find use with respect to anomaly and/or primary signal detection for the second area 1010b despite the fact that the ML model 1007d would presumably not be further trained, or at least not directly by the fourth UE 1006d. For example, the ML model 1007d may be used by the controller 1002 to determine a presence of a primary signal in the second area 1010b. The ML model 1007d may also be potentially used in synchronizing the ML models 1007 relating to the second area 1010b. For example, the ML model 1007d may have been determined as the "best" ML model 1007 for the second area 1010b and propagated by the controller 1002 to any other UEs 1006 located in the second area 1010b for their respective use and subsequent training.

At step 906, the controller 1002 receives, from the fourth UE 1006d (i.e., the "first UE device" referred to in FIG. 9), anomaly data 1030d indicative of an anomaly detected by the fourth UE 1006d via the ML model 1007a. The fourth UE 1006d sending the anomaly data 1030d to the controller 1002 is indicated by the arrow 1050d in FIG. 10. The anomaly indicated in the anomaly data 1030d may be an anomaly in the RF environment associated with the first area 1010a and/or the fourth UE 1006d. The anomaly data 1030d may have been determined by the fourth UE 1006d based on RF data collected by the fourth UE 1006d while the fourth UE 1006d was located in the first area 1010a. Anomaly data 1030 is described in further detail herein. It will be noted that the receiving the anomaly data 1030d may be independent of any subsequent primary signal detection (e.g., determining a presence of a primary signal). That is, step 908 may be considered as optional with respect to steps 902, 904, and/or 906.

At step 908, the controller 1002 determines, based on the anomaly data 1030d from the fourth UE 1006d (i.e., the "first UE device" referred to in FIG. 9), that a primary signal is present in an RF environment associated with the first area 1010a (and/or associated with the fourth UE 1006d). Such determination is represented in FIG. 10 by a primary signal detection 1060 reported by the controller 1002. Based on determining the presence of the primary signal, the fourth UE 1006d (as well as other UEs 1006 in the first area 1010a) may be forced to switch its operating frequency spectrum to one that will not cause interference with the primary signal. Determining that a primary signal is present in an RF environment is described in further detail herein.

The controller 1002 may additionally or alternatively receive respective anomaly data 1030a-c from the first, second and/or third UEs 1006a-c, as indicated by the arrows 1050a-c. The determination that a primary signal is present in the RF environment associated with the first area 1010a (and/or associated with the first, second, and/or third UEs 1006a-c) may be further based on one or more of the anomaly data 1030a-c.

In an additional or alternative example embodiment, machine learning parameters of an ML model 1007 may be exchanged between the various UEs 1006 (instead of or in addition to the ML model 1007 itself) to manage the ML models 1007 as UEs 1006 move between predefined areas. For example, in step 904 of the method of FIG. 9, the controller 1002 may send one or more machine learning parameters of the first UE's 1006a ML model 1007a to the fourth UE 1006d (i.e., the "first UE device" referred to in FIG. 9). The one or more machine learning parameters of the ML model 1007a may have been earlier received by the controller 1002 from the first UE 1006a. The fourth UE 1006d may receive the one or more machine learning parameters of the ML model 1007a and configure (e.g., update or revise), at least in part, its ML model 1007d with the one or more machine learning parameters of the ML model 1007a. For example, the fourth UE 1006d may replace one or more machine learning parameters of the ML model 1007d with the one or more machine learning parameters of the ML model 1007a. In step 906, the anomaly data 1030d received by the controller 1002 from the fourth UE 1006d may have been determined by the fourth UE 1006d using the one or more machine learning parameters of the ML model 1007a (e.g., via the ML model 1007d configured, at least in part, with the one or more machine learning parameters of the ML model 1007a). Step 908 may be performed as described above using this anomaly data so-determined from the fourth UE 1007d.

In addition, based on determining that the fourth UE 1006d moved from the second area 1010b to the first area 1010a, the fourth UE 1006d may send one or more machine learning parameters of its ML model 1007d (instead of or in addition to the ML model 1007d) to the controller 1002. The one or more machine learning parameters of the ML model 1007d (as they were at the time that the fourth UE 1006d moved into the first area 1010a) may be used by the controller 1002 for primary signal detection operations with respect to the second area 1010b, as these machine learning parameters may relate more to the RF environment associated with the second area 1010b. For example, the controller 1002 may send the one or more machine learning parameters of the ML model 1007d (as they were at the time that the fourth UE 1006d moved into the first area 1010a) to a UE 1006 in the second area 1010b for it to update its ML model 1007 with the one or more machine learning parameters of the ML model 1007d.

While the system and method have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present disclosure includes any and all embodiments of the following claims.

What is claimed is:

1. A method comprising:
  causing a first user equipment (UE) device, located in a predefined area, to determine a first machine learning model comprising a software application and configured to detect an anomaly in an RF environment associated with the predefined area;

receiving, by a controller, the first machine learning model comprising the software application from the first UE device;

sending, by the controller, the first machine learning model comprising the software application to a second UE device located in the predefined area; and receiving, by the controller and from the second UE device, anomaly data indicative of an anomaly detected by the second UE device via the first machine learning model.

2. The method of claim 1, further comprising:

determining, by the controller and based on the anomaly data from the second UE device, that a primary signal is present in an RF environment associated with the predefined area.

3. The method of claim 2, further comprising:

receiving, by the controller and from the first UE device, second anomaly data indicative of an anomaly detected by the first UE device via the first machine learning model, wherein the determining that the primary signal is present is further based on the second anomaly data.

4. The method of claim 2, further comprising:

causing the second UE device to switch its operating frequency spectrum to a frequency spectrum that will not cause interference with the primary signal.

5. The method of claim 1, further comprising:

causing the second UE device to replace a second machine learning model, previously determined by the second UE device and configured to detect an anomaly in an RF environment, with the first machine learning model.

6. The method of claim 1, further comprising:

causing the second UE device to further train the first machine learning model based on RF data collected by the second UE device while in the predefined area.

7. The method of claim 1, wherein the controller is integrated with a base station configured to wirelessly communicate with the first UE device and the second UE device.

8. A method comprising:

determining, by a first user equipment (UE) device located in a predefined area, a first machine learning model configured to detect an anomaly in an RF environment associated with the predefined area;

receiving, by the first UE device, a second machine learning model determined by a second UE device located in the predefined area, wherein the second machine learning model comprises a software application and is configured to detect an anomaly in an RF environment associated with the predefined area;

determining, by the first UE device, anomaly data indicative of an anomaly detected by the first UE device via the second machine learning model; and sending, by the first UE device, the anomaly data to a controller configured to determine that a primary signal is present in an RF environment based on anomaly data sent from one or more UE devices.

9. The method of claim 8, wherein the second machine learning model is received by the first UE device from the controller.

10. The method of claim 8, further comprising:

switching, by the first UE device, its operating frequency spectrum to a frequency spectrum that will not cause interference with a primary signal.

11. The method of claim 8, wherein the anomaly is detected by the first UE device via a combination of the first machine learning model with the second machine learning model.

12. The method of claim 8, further comprising:

updating, by the first UE device, the first machine learning model with the second machine learning model to detect the anomaly via the second machine learning model.

13. The method of claim 12, wherein the updating the first machine learning model with the second machine learning model comprises updating the first machine learning model with one or more machine learning parameters of the second machine learning model.

14. The method of claim 8, further comprising:

further training, by the first UE device, the second machine learning model based on RF data collected by the first UE device while in the predefined area.

15. A method comprising:

causing a first user equipment (UE) device, located in a predefined area, to determine a first machine learning model configured to detect an anomaly in an RF environment associated with the predefined area;

receiving, by a controller and from the first UE device, one or more machine learning parameters of the first machine learning model;

sending, by the controller the one or more machine learning parameters of the first machine learning model to a second UE device located in the predefined area; and receiving, by the controller and from the second UE device, anomaly data indicative of an anomaly detected by the second UE device via a second machine learning model configured, at least in part, with the one or more machine learning parameters of the first machine learning model.

16. The method of claim 15, further comprising:

determining, by the controller and based on the anomaly data from the second UE device, that a primary signal is present in an RF environment associated with the predefined area.

17. The method of claim 16, further comprising:

causing the second UE device to switch its operating frequency spectrum to a frequency spectrum that will not cause interference with the primary signal.

18. The method of claim 15, further comprising:

causing the second UE device to replace one or more machine learning parameters of the second machine learning model with the one or more machine learning parameters of the first machine learning model.

19. The method of claim 15, further comprising:

causing the second UE device to further train the second machine learning model based on RF data collected by the second UE device while in the predefined area.

20. The method of claim 15, wherein the controller is integrated with a base station configured to wirelessly communicate with the first UE device and the second UE device.

* * * * *